Figure 1:
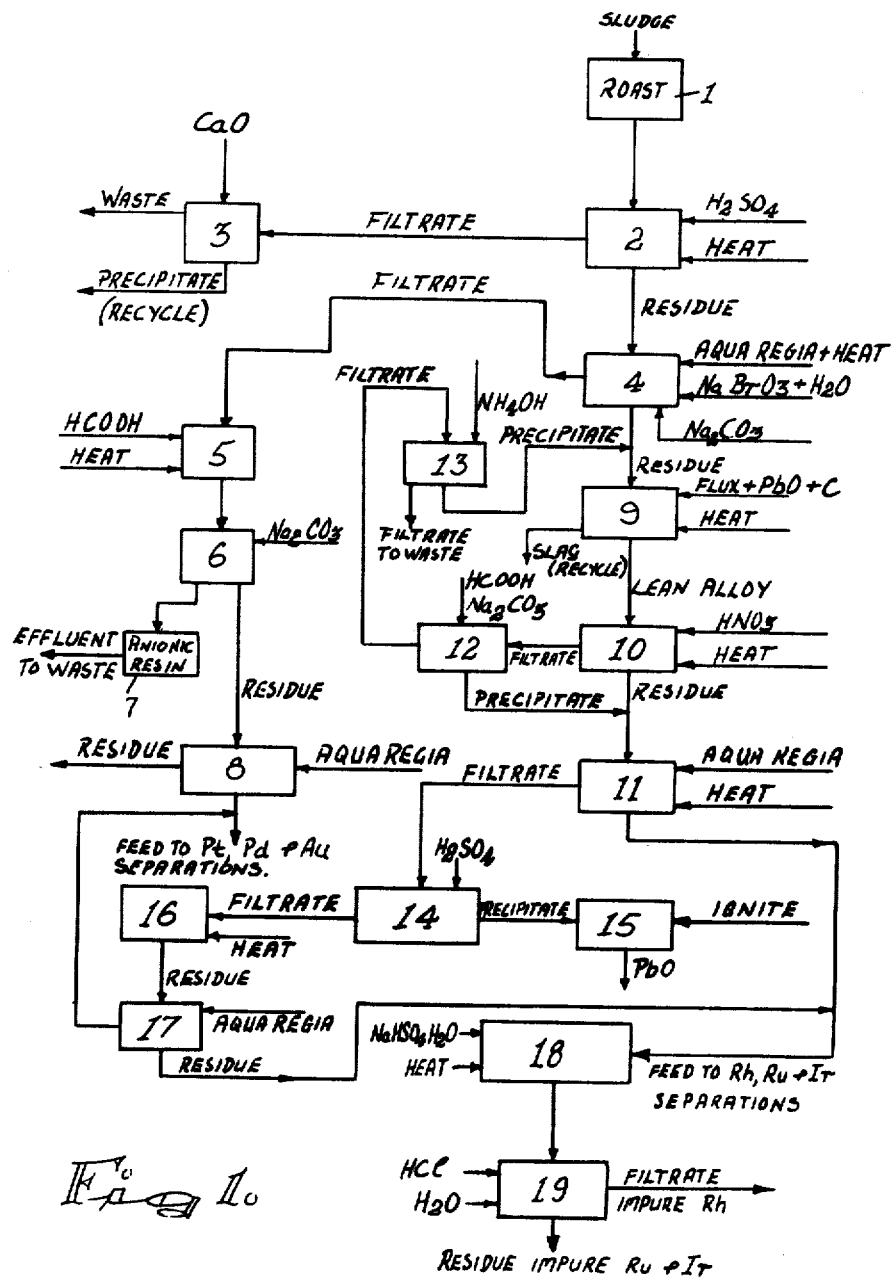

United States Patent
Pittie et al.

[11] 3,876,747
[45] Apr. 8, 1975

[54] SEPARATION AND PURIFICATION OF IRIDIUM

[75] Inventors: Willem Hubert Pittie, Roodepoort; Gerhardus Overbeek, Florida; Kingsley Ferguson Doig, Johannesburg, all of South Africa

[73] Assignee: Swarsab Mining, Exploration & Development Company (Proprietary) Limited, Johannesburg, South Africa

[22] Filed: Aug. 2, 1973

[21] Appl. No.: 384,824

[30] Foreign Application Priority Data
Aug. 10, 1972  South Africa .................. 5498/72

[52] U.S. Cl. .............. 423/22; 423/34; 423/35; 75/108; 75/118; 75/121
[51] Int. Cl. .............. C01g 55/00; C01g 7/00
[58] Field of Search ........ 423/22, 34, 35; 75/108, 75/118, 121

[56] References Cited
UNITED STATES PATENTS
2,714,555  8/1955  Stevenson et al. .............. 423/22
3,024,084  3/1962  Raper et al. .............. 423/22

OTHER PUBLICATIONS
Beamish, "Talanta," Vol. 5, 1960, pp. 1–35.

*Primary Examiner*—Herbert T. Carter
*Attorney, Agent, or Firm*—Irwin M. Aisenberg

[57] ABSTRACT

A method of separating iridium from at least one other metal of the group consisting of platinum, palladium, ruthenium, rhodium and gold comprising converting the PGMs and gold in a solution thereof to lower oxidation states by treating the solution with hydrogen peroxide in acid medium at elevated temperature, adjusting the pH of the solution to approximately pH 9, separating the precipitate to leave iridium and platinum in solution, thereafter converting the platinum and iridium to their highest valency states by the action of sodium bromate in acid medium at elevated temperature and adjusting the pH of the solution to between about 6.5 and 7.5 to precipitate iridium and leave platinum in solution.

6 Claims, 2 Drawing Figures

SEPARATION AND PURIFICATION OF IRIDIUM

This invention relates to the separation and purification of iridium from mixtures of Platinum Group Metals (hereinafter referred to as PGMs) and gold.

In general, the five PGMs, namely, platinum, palladium, iridium, ruthenium and rhodium, occur together in nature with gold and these six elements must be separated from each other and purified in order to be useful in trade or industry. In general, an initial separation of these elements into two groups is effected by treating the basic mixture, which is generally a matte leach residue or sludge, with aqua regia, in which case the platinum, palladium and gold dissolved whilst the iridium, ruthenium and rhodium remain substantially in the residue resulting from this process. The two groups of metals obtained in this manner are then subjected to generally long and complicated separation procedures in order to separate and purify the individual metals.

It is the object of this invention to provide a method of separating iridium from other PGMs and gold which will be easier to effect and/or which will result in a better purity product being obtained.

In accordance with this invention there is provided a method of separating iridium from other PGMs and/or gold comprising converting the PGMs and gold in a solution thereof to lower oxidation states by treating the solution with hydrogen peroxide in acid medium at elevated temperature, adjusting the pH of the solution to approximately pH 9, separating the precipitate to leave iridium and platinum in solution, thereafter converting the platinum and iridium to their highest valency states by the action of sodium bromate in acid medium at elevated temperatures and adjusting the pH of the solution to between about 6.5 and 7.5 to precipitate iridium and leave platinum in solution.

A further feature of the invention provides for the feed to contain iridium mixed with relatively small amounts of other PGMs and/or gold, iridium having been concentrated in preceding treatments.

Still further features of the invention will become apparent from the following detailed description thereof, this description embodying a specific example of the invention.

Figure 2:
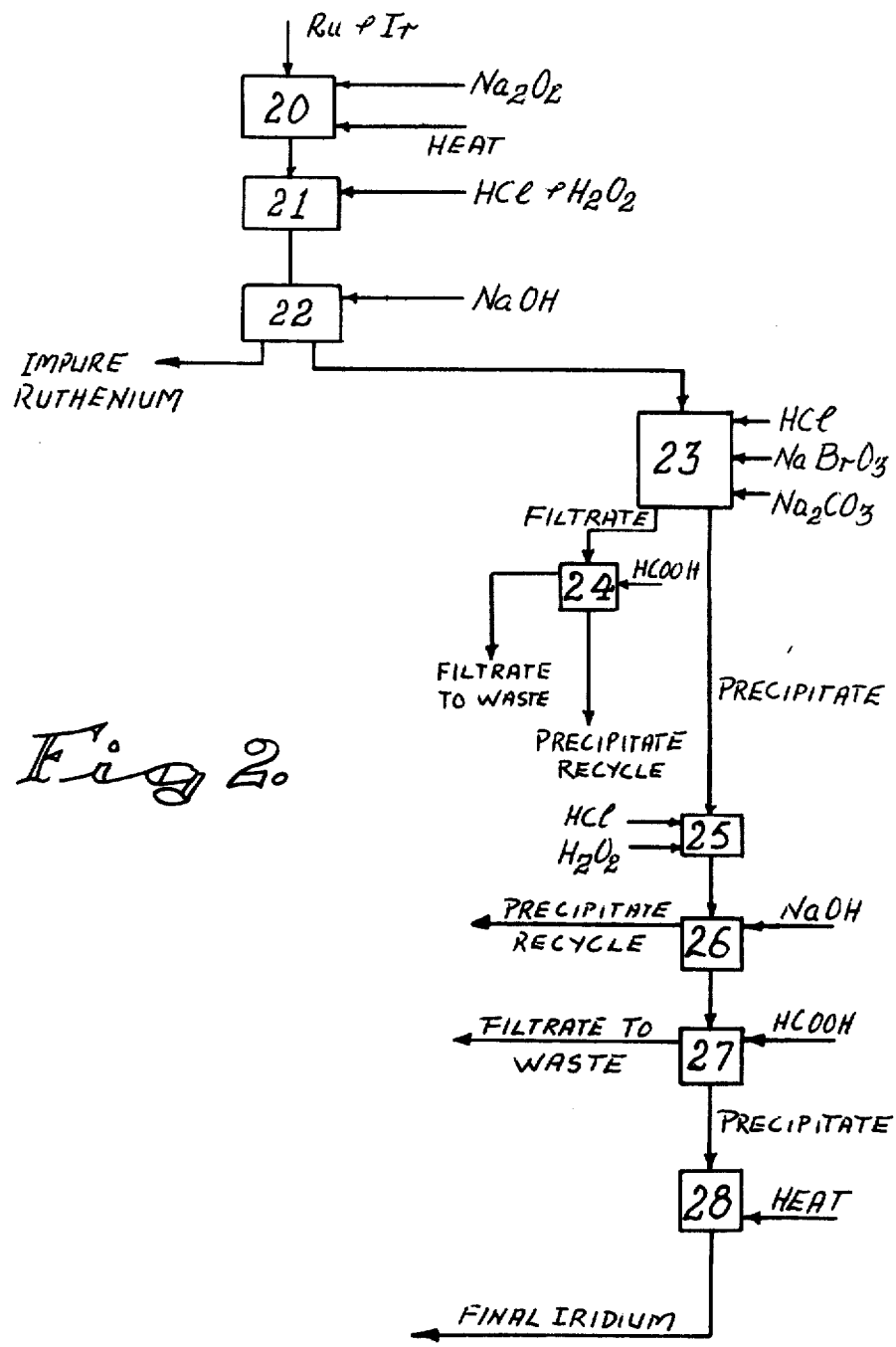

In this description reference will be made to the accompanying flow sheets in which:

FIG. 1 is a flow sheet showing initial separation of PGMs and gold obtained in a matte leach residue; and FIG. 2 is a flow sheet illustrating purification of iridium according to the invention.

In general, iridium is obtained from matte leach residues which also generally contain the other four PGMs as well as gold.

The sludge used as a starting material in this embodiment contained the following:

| Element | | % |
|---|---|---|
| Platinum | (Pt) | 6.92 |
| Palladium | (Pd) | 3.04 |
| Gold | (Au) | 0.59 |
| Rhodium | (Rh) | 0.32 |
| Ruthenium | (Ru) | 0.60 |
| Iridium | (Ir) | 0.08 |
| Silver | (Ag) | 0.03 |
| Alumina | (Al$_2$O$_3$) | 3.60 |
| Antimony | (Sb) | 0.05 |
| Bismuth | (Bi) | 0.11 |

-Continued

| Element | | % |
|---|---|---|
| Calcium Oxide | (CaO) | 0.49 |
| Copper | (Cu) | 6.91 |
| Cobalt | (Co) | 0.19 |
| Iron | (Fe) | 4.57 |
| Magnesia | (MgO) | 0.35 |
| Nickel | (Ni) | 3.50 |
| Organic matter | (Cn(H$_2$O)$_m$) | 23.1 |
| Potassium | (K) | 0.03 |
| Silica | (SiO$_2$) | 12.92 |
| Sodium | (Na) | 9.25 |
| Sulphur (Total) | (S) | 19.63 |
| Tellurium | (Te) | 0.29 |
| Zinc | (Zn) | <0.001 |
| Other + O$_2$ + H$_2$O (By diff) | | 3.43 |
| | | 100.00 |

Firstly, 2.5 Kg of the sludge was roasted in a stream of air at 600°C for two hours in order to convert any sulphides and free sulphur to oxides at stage 1.

The roasted material was boiled at stage 2 for 2 hours with 20% H$_2$SO$_4$ (3 l) under reflux with stirring, cooled to ±55°C and filtered to dissolve the bulk of the base metals present.

To the filtrate calcium oxide (CaO) was added at stage 3 to precipitate all the nickel, copper, PGMs and gold in the filtrate. This precipitate was kept and contained 30 mg platinum, 100 mg palladium, 10 mg gold, 50 mg rhodium and 40 mg iridium. In practice this precipitate would be recycled to a matte smelter.

The residue obtained after the sulphuric acid treatment was then leached at stage 4 with aqua regia (1½ l) for 3 hours. This aqua regia leach and all subsequent aqua regia leachings were carried out as follows:

The material was boiled with the required amount of hydrochloric acid (HCl) under reflux for thirty minutes. The reguired quantity of nitric acid (HNO$_3$) was then added slowly over a period of sixty minutes. The mixture was then allowed to boil for the remaining length of time (i.e., 1½ hours).

Sodium bromate (NaBrO$_3$) (30 g) was then added to the solution which was allowed to boil for a further thirty minutes after diluting the solution with water (1.5 – 3 l) to oxidize the PGMs and gold to their highest stable oxidation states. The pH was then adjusted to 6.5 with sodium carbonate (±60°C) (1 Kg) to precipitate all the metals except platinum as their hydrated oxides. The solution was allowed to stand for 20 minutes and then filtered under vacuum. The platinum was removed in this manner in order to decrease the bulk of the PGMs and gold to be subjected to lead alloying by about 50%.

To the filtrate (+90% of platinum (Pt) in the feed) formic acid (0.2 l) was added at stage 5 and the solution boiled under reflux with stirring for 5 hours. Sodium carbonate (Na$_2$CO$_3$) (0.3 Kg) was added at stage 6 stage-wise over a period of one hour until a pH 5.0 was obtained. The solution was then boiled for a further 60 minutes, cooled to 60°C and filtered under vacuum. These steps 5 and 6 were performed in order to precipitate platinum in solution.

The filtrate was passed over an anionic exchange column at stage 7 and the effluent discarded. This effluent contained 100 mg Pt, 10 mg Pd, 10 mg Au, 1 mg Rh and 25 mg Ir.

The precipitate was dissolved at stage 8 in aqua regia (1.0 l) cooled and filtered. The residue obtained was silver chloride (AgCl).

This aqua regia filtrate contained the bulk of the platinum. This platinum was combined with the bulk of the palladium and gold as described hereinafter and separation of these PGMs effected by a separate procedure.

The residue/precipitate obtained from the initial aqua regia leach and sodium carbonate precipitation at stage 4 (+1,400 g) was mixed with a Flux A and a Flux B defined below and fused at stage 9 for 75 minutes at 1,140°C. The result of this is that the rhodium is for the most part converted from an aqua regia insoluble form to an aqua regia soluble form. Also the solubility in aqua regia of the iridium and ruthenium is further decreased. 2.5 Kg of Flux A per Kg of residue and 335 g of Flux B per 100 g of PGM + Au to be collected were used. These fluxes had the following compositions:

FLUX A (active flux) (3.5 Kg)
(1) Borax $Na_2B_4O_7$ : 20% (0.75 Kg)
(2) Sodium carbonate $Na_2CO_3$ : 80% (2.75 Kg)
FLUX B (Collector) (0.55 Kg)
(1) Litharge PbO : 90% (0.5 Kg)
(2) Charcoal C : 10% (0.05 Kg)

The molten material was poured into iron moulds where it was allowed to cool. The lead buttons thus obtained were separated from the slag and the slag was crushed and kept but in practice would be returned to the matte smelter. The slag containing 520 mg Pt, 230 mg Pd, 45 mg Au, 24 mg Rh, 45 mg Ru (ruthenium) and 5 mg Ir.

The lead buttons were crushed and then boiled at stage 10 for 5 hours under reflux with 20% $HNO_3$ (5.5 l) in order to remove lead. The solution was cooled to 55°C and filtered under vacuum. The residue was fed to a subsequent aqua regia leach step indicated at stage 11.

Formic acid (0.05 l) was added at stage 12 to the filtrate from the nitric acid leach of stage 10 and the pH adjusted to 2.0 with sodium carbonate $Na_2CO_3$ (0.3 Kg) to precipitate any PGMs and gold dissolved by the nitric acid. The solution was then stirred for 5 hours at room temperautre and filtered under vacuum.

The precipitate obtained was combined with the residue obtained from the nitric acid leach step at stage 10 and fed to the aqua regia leach step at stage 11. $NH_4OH$ was added at stage 13 to the filtrate to precipitate the lead and any PGM + Au present and this precipitate was dired — ignited and in practice would be returned to the lead fusion step at stage 9.

The combined residue/precipitate was boiled at stage 11 with aqua regia (0.75 l) for three hours under reflux. The solution was cooled to 55°C and filtered under vacuum. The residue formed part of the feed to the process for separating rhodium, iridium and ruthenium from each other. This residue contained 850 mg Pt, 700 mg Pd, 100 mg Au, 5,000 mg Rh, 14,720 mg Ru and 1,420 mg Ir. The precious metals usually make up approximately 50% of this by metal concentrate, the remaining 50% being lead chloride ($PbCl_2$).

To the filtrate from the aqua regia leach step at stage 11 the stoichiometric amount of $H_2SO_4$ plus a 10% excess (100 ml of 50% $H_2SO_4$) was added at stage 14 to precipitate lead present in this solution. The solution was boiled for thirty minutes, cooled to 55°C and filtered.

The precipitated lead sulphate was ignited at stage 15 to litharge (PbO) and was ready to be recycled to the lead fusion step.

The filtrate from the lead precipitation step was evaporated to dryness at stage 16 and the salts thus obtained ignited at 600°C for two hours. This temperature was found to be important in rendering rhodium in the residue aqua regia insoluble.

The ignition product was then boiled at stage 17 with aqua regia (0.75 l) under reflux for 3 hours, The solution was cooled and filtered under vacuum.

The residue was combined with the residue from the aqua regia leach step of stage 11 effected after alloying to give a combined feed for the separation of the secondary PGMs, namely, rhodium, ruthenium and iridium having a PGM and gold content of 1,130 mg Pt, 850 mg Pd, 120 mg Au, 7,480 mg Rh, 14,920 Ru and 1,720 mg Ir.

The filtrate obtained from the final aqua regia leach step of stage 17 was combined with that obtained in the aqua regia leach step of stage 8 performed on the metals dissolved in the initial leach step 4 to provide a feed for the separations process of platinum, palladium and gold. This feed had a PGM and gold content of 171,210 mg Pt, 74,790 mg Pd, 14,560 mg Au, 200 mg Rh, 25 mg Ru and 210 mg Ir.

The feeds obtained from three cycles of the above procedure and containing the rhodium, ruthenium and iridium were combined in provide a feed for the iridium separations steps. This feed then contained 3,390 mg Pt, 2,550 mg Pd, 360 mg Au, 22,440 mg Rh, 44,760 mg Ru and 5,160 mg Ir.

This feed was fused with five times its own weight of $NaHSO_4·H_2$) (0.8 Kg) at 600°C for 1 hour in a silica pot at stage 18. The melt was dissolved in boiling HCl (1 litre) at stage 19. The solution was then diluted with water to double its original volume and then filtered under vacuum (1 litre + 2 litre).

The filtrate was used as a feed to a rhodium purification process and contained 300 mg Pt, 2,000 mg Pd, 20 mg Au, 14,500 mg Rh, 60 mg Ru and 40 mg Ir. The residue was sintered at stage 20 with three times its own weight of $Na_2O_2$ (0.25 Kg) in an iron tray at 500°C for two hours. The melt was dissolved in 50% HCl (1.5 l) at stage 21.

$H_2O_2$(0.07 l) was then added to the solution and the mixture then boiled under reflux for thirty minutes to reduce the metals to lower valency states. The pH of the solution was then adjusted at stage 22 to 9.0 with NaOH (0.7 Kg) to precipitate all PGMs and gold other than platinum and iridium. The solution was cooled to 55°C and filtered under vacuum.

The precipitate constituted the feed to a ruthenium purification process and contained 90 mg Pt, 500 mg Pd, 330 mg Au, 7,900 mg Rh, 44,650 mg Ru and 1,620 mg Ir. The filtrate constituted feed to the iridium purification process and contained 300 mg Pt, 50 mg Pd, 10 mg Au, 40 mg Rh, 50 mg Ru and 3,500 mg Ir.

This iridium containing feed was firstly treated at stage 23 with sodium bromate $NaBrO_3$ (7 g), solution was adjusted to 2.0 with HCl and the solution boiled for thirty minutes in order to oxidize the iridium to a higher valency state.

Then the pH of the boiling solution was adjusted too 7.0 with $Na_2CO_3$ and allowed to boil for an hour, cooled and the iridium hydroxide was filtered off with platinum remaining in solution.

The precious metals left in the filtrate were precipitated at stage 24 by boiling with formic acid and this precipitate would in practice be recycled to the roasting step.

The iridium hydroxide precipitate was dissolved at stage 25 in 50% HCl (0.07 l). The solution was boiled for approximately one hour until the initial purple iridium chloride species had been converted to a brown iridium chloride species.

Then $H_2O_2$ (7 ml) was added and the boiling continued for a further fifteen minutes. The pH of the solution was adjusted at stage 26 to 9.0 with NaOH, cooled and filtered. The precipitate in practice would be recycled to the initial roasting step.

Iridium hyroxide was precipitated from the solution as described above at stage 27. The hydroxide was ignited at stage 28 at 1,000°C to metal and cooled in a stream of nitrogen. This metal was the final iridium and was 99.9% pure. The yield was Ir = 2,000 mg which was 33.33% of the feed.

Thus the invention provides an effective method of separating and purifying iridium from mixtures of PGMs and gold.

What we claim as new and desire to secure by Letters Patent is:

1. A method of separating iridium from at least one other metal selected from the group consisting of platinum, palladium, ruthenium, rhodium and gold comprising converting the at least one other metal; in a solution thereof to lower oxidation states by treating the solution with hydrogen peroxide in acid medium at elevated temperature, adjusting the pH of the solution to approximately pH 9, separating any precipitate and thus leaving iridium and any platinum in solution, thereafter converting the platinum and iridium to their highest valency states by contacting them with sodium bromate in acid medium at elevated temperature and then adjusting the pH of the solution to between about 6.5 and 7.5 to precipitate iridium and leave platinum in solution.

2. A method as claimed in claim 1 in which the iridium is mixed with minor amounts of other PGMs and gold.

3. A method as claimed in claim 2 in which the iridium is contained in residue from an aqua regia leach step performed on a mixture of PGMs and gold.

4. A method as claimed in claim 3 in which the residue is treated for removal of rhodium therefrom prior to treatment with hydrogen peroxide.

5. A method as claimed in claim 1 in which the pH of the solution is increased by the use of sodium hydroxide.

6. A method as claimed in claim 1 in which the treatment with hydrogen peroxide is carried out in hydrochloric acid medium.

* * * * *